United States Patent
Wolf et al.

[15] 3,683,073
[45] Aug. 8, 1972

[54] METHOBOTTROMYCIN, PROCESS FOR PREPARING AND USING SAME

[72] Inventors: Frank J. Wolf, Westfield; William J. Miller, Somerset; Louis Chaiet, Springfield, all of N.J.

[73] Assignee: Merck & Co., Inc., Rahway, N.J.

[22] Filed: March 14, 1968

[21] Appl. No.: 713,255

Related U.S. Application Data

[63] Continuation of Ser. No. 480,039, Aug. 16, 1965, abandoned.

[52] U.S. Cl....................................424/117, 195/80
[51] Int. Cl. ...............................................A61k 21/00
[58] Field of Search ........................424/117; 195/80

[56] References Cited

OTHER PUBLICATIONS

Derwent Farmdoc No. 25,373, Abstracting WE 66, 11513, published Feb. 17, 1967.

*Primary Examiner*—Jerome D. Goldberg
*Attorney*—Reverdy Johnson and I. Louis Wolk

[57] ABSTRACT

This invention relates to a new antibiotic agent, methobottromycin, its salts, the process of preparing same, and their use as an antibiotic agent in the treatment of chronic respiratory disease in chickens and infectious sinusitis in turkeys.

11 Claims, 1 Drawing Figure

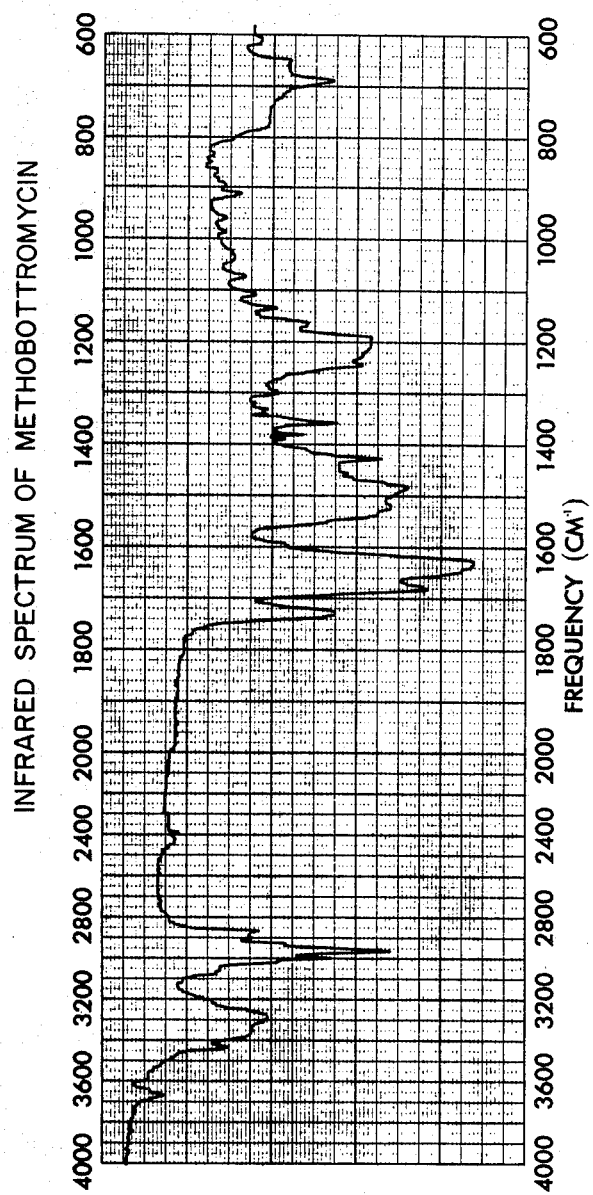

METHOBATHOMYCIN, PROCESS FOR PREPARING AND USING SAME

This application is a continuation of Ser. No. 480,039, filed Aug. 16, 1965, now abandoned.

This invention relates to a new antibiotic agent, its salts, the method of preparing same and their use. More particularly, the present invention is concerned with a novel, highly active antibiotic compound known as methobottromycin, its salts, the process of preparing same, and their use as an antibiotic agent in the treatment of chronic respiratory disease in chickens and infectious sinusitis in turkeys.

The discovery of remarkable antibiotic properties of penicillin and similar substances has stimulated great interest in the field of antibiotic compounds such as: streptomycin, gramicidin, subtilin, bacitracin, chlortetracycline, oxytetracycline, cycloserine, colistin fervenulin, streptozotocin, novobiocin and the like. In general, such antibiotics are particularly active against certain gram positive bacteria. Others are active against gram negative bacteria and some are active against both gram negative and gram positive bacteria. However, the activity of these known antibiotics is usually limited to a few pathogenic microorganisms and work has been conducted in this field in an attempt to find additional antibiotic substances which would be effective against other pathogens.

In addition, many bacteria which, at one time, were controlled by known antibiotics, have developed increasing resistance over the years to these antibiotic substances. As a result, although some of these antibiotics have been found to be invaluable in the treatment of various diseases, it has been discovered that certain strains of some pathogens develop a resistance to various particular antibiotics and, consequently, these antibiotics are no longer active against such strains of pathogens or the activity of these antibiotics has been reduced to such a degree so as to make their use against such pathogens of little consequence.

Accordingly, the deficiencies of the known antibiotics have stimulated further research to find other antibiotics which will be highly active against a wider range of pathogens as well as those strains of various microorganisms which are resistant to other antibiotics. This is true not only with disease-producing bacteria which attack humans but also for disease-producing bacteria which attack animals and poultry.

Chronic respiratory disease is a disease of chickens and turkeys, caused by a certain group of microorganisms known as PPLO or pleuropneumonia-like organisms, which have been classified as Mycoplasma. This is referred to in the art as PPLO infection. In chickens the disease may be complicated by a secondary invader, at which time the disease is known as chronic respiratory disease complex. In turkeys this disease appears in two forms. It is called infectious sinusitis when it is in the form that affects the upper respiratory tract, and air sac disease when it affects the lower respiratory areas. For the purpose of simplicity, these diseases will be referred to herein as infectious sinusitis.

In chickens the chronic respiratory disease symptoms may be like those of any other respiratory disease such as Newcastle disease, infectious bronchitis, laryngotracheitis, fungus infection, etc. The usually observed symptoms are nasal discharge and a slight swelling below the eye. Coughing, sneezing, and a hoarse throat rattle or rale may accompany these signs. The symptoms of the disease in turkeys is often demonstrated by swollen sinuses with gelatinous exudate, watery eyes and coughing. The air sacs and respiratory passages will be plugged by cheesey exudates.

The economic loss that accompanies chronic respiratory disease is a drop in egg production by at least 10 to 40 percent, which affects the birds for several weeks or months. Poor hatchability of fertile eggs laid by infected hens can cause additional losses. Mycoplasma (PPLO) caused infection results in the death of a high percentage of embryos. Loss of weight in a large percentage of birds is also evident. There is, in addition, a significant amount of mortality in birds beginning at about four weeks of age.

Infection of birds may occur in a number of ways. Birds may be infected by contact with other infected birds, usually by an inhalation of nasal exudate from a sneezing bird. In fact, infected chickens or turkeys may become sick, and they may become carriers in which they appear to be healthy but are, in fact, infected with pathogenic strains of Mycoplasma (PPLO). In addition, birds may be infected through contaminated litter, manure, water and feed, breeding hens or contaminated hatcheries. Transmission of the disease via an infected embryonated egg contributes largely to an infected flock.

Chemotherapeutic control of these diseases has been successful with a very limited number of compounds. With one exception, the agents which have been found satisfactory are known antibiotics used clinically for other diseases, principally human diseases. The exception is the antibiotic tylosin. Although tylosin is used fairly broadly, strains of PPLO resistant to it have been encountered, and the antibiotic has been shown to be toxic in use with turkeys.

Other antibiotics useful for controlling chronic respiratory disease in chickens and infectious sinusitis turkeys are erythromycin and chlortetracycline or oxytetracycline. However, the dosage levels of these antibiotics required to obtain good results are quite high, which results in an economic barrier to the user. Other antibiotics known to have anti-PPLO activity usually require a dosage level too close to the toxic level to be of practical value. Included in this group are neomycin, kanamycin, and chloramphenicol.

Many other antibacterial antibiotics which are used for other infections have been found to be without effect on the PPLO. Examples of these would include penicillin and its many derivatives, cycloserine, novobiocin, and many others. As can be seen, this group includes agents with a wide spectrum of activity, hence their inactivity against Mycoplasma shows how these microbes are a unique and specialized type of bacterium.

It is an object of the present invention to provide useful antibiotic substances which are highly effective in controlling the primary etiologic agent of chronic respiratory disease of chickens and infectious sinusitis of turkeys.

An additional object of the present invention is to produce a new and useful antibiotic substance which may be used in higher concentrations than those presently available without the resultant danger of toxicity.

Another object of the present invention is to provide an antibiotic that has an acceptable oral absorption for treating chronic respiratory disease of chickens and infectious sinusitis of turkeys.

A further object of the present invention is to provide an antibiotic that may be applied in relatively low dosages in the treatment of chronic respiratory disease of chickens and infectious sinusitis of turkeys.

Another additional object of the present invention is to provide an antibiotic that is active against a wide range of strains of mycoplasmas, including those belonging to the species *M. gallisepticum* (PPLO), in the treatment of chronic respiratory disease of chickens and infectious sinusitis of turkeys.

A still further object of the present invention is to provide a process of preparing this novel antibiotic substance.

Other additional objects of the present invention will become apparent to those skilled in the art by reading the following specification.

The new antibiotic substances of the present invention are found by growing, under controlled conditions, a previously unknown species of microorganism. The microorganism was isolated from the fermentation broth of a soil actinomycete collected from Canada. This new microorganism has been designated *Streptomyces canadensis* MA–959 in the culture collection of Merck & Co., Inc., Rahway, New Jersey. A culture thereof has been deposited with the fermentation section of the American Type Culture Collection, 12301 Parklawn Drive, Rockville, Maryland, and added to its permanent culture collection as ATCC 17776.

The morphological and cultural characteristics of *Streptomyces canadensis* MA–959 are set forth in the following:

STREPTOMYCES CANADENSIS MA–959

Morphology — Biverticillate. Straight chains of eight to 10 spores, a few chains longer. Spores cylindrical ($950 \times$ Avg. size $1.0\mu \times 1.7\mu$.)

Czapek Dox Agar (Sucrose Nitrate) — Growth light. Aerial mycelium scant, white. Vegatative growth colorless. Reverse colorless. No soluble pigment. Sporulation good.

Glycerol —Aspargine agar — Growth good. Aerial mycelium medium gray. Vegatative growth brown to reddish-brown. Reverse brown to reddish-brown. Soluble pigment brown to reddish-brown (pink in early stage of growth — 1 week). No sporulation observed.

Tomato paste —Oatmeal agar — Growth good. Aerial mycelium medium gray with white tufts and pink exudate appearing after 3 weeks. Vegetative growth brown. Reverse dark brown. Soluble pigment brown. Some sporulation.

Emerson's agar — Growth moderate. Aerial mycelium scant, light gray. Vegetative growth brown. Reverse brown. Soluble pigment light brown (pink in early stage).

Potato plug — Growth good. Colonies smooth, cream to grayish-brown. Aerial mycelium light gray (appears only in drier portion of plug). Soluble pigment medium brown (pink in early stage).

Starch agar — Growth good. No aerial mycelium. Vegetative growth light brown. Reverse light brown. Soluble pigment light brown (pink in early growth stage). Hydrolysis.

Nutrient Gelatin plate — Growth good. No aerial mycelium. Vegetative growth light brown. Reverse light brown. Soluble pigment light brown. Liquefaction.

Gelatin stab — Soluble pigment dark greenish-brown. One-third liquefaction.

Calcium Malate agar — Growth good. Aerial mycelium scant, pinkish white. Vegetative growth yellowish brown. Slight browning of medium along growth streak.

Tyrosine agar — Growth moderate. Aerial mycelium pale pinkish-white. Vegetative growth very light brown. Slight browning of medium.

Peptone-Iron Yeast Extract slant — Growth good. No aerial mycelium. Vegetative growth gray. Soluble pigment blue-black at 2 days. Medium brown at 3 weeks.

Skim Milk agar — Growth good. Aerial mycelium pinkish white. Vegetative growth light brown. Soluble pigment very light brown. No hydrolysis.

Reduction of nitrates — Negative under test conditions in organic and synthetic media.

Temperature — Good growth at 28° C. No growth at 50° C.

Micro-aerophilic growth — (yeast extract—dextrose stab) Heavy surface growth and along two-thirds of stab line.

Milk — Peptonization complete at 3 weeks. No coagulation. Heavy brownish growth ring with sparse aerial mycelium (light gray). Soluble pigment medium grayish-brown. Alkaline reaction (pH 7.9).

Litmus Milk — Peptonization complete in 3 weeks. No coagulation. Alkaline reaction.

The above description of the microorganism-producing methobottromycin is given as illustrative of suitable strains of Streptomyces which can be used in the production of methobottromycin, but it is understood that the information herein described is not to be limited to organisms answering this particular description. The present invention also contemplates the use of other species of Streptomyces or mutants of the described organisms such as those obtained by natural selection or those produced by mutating agents, for example, X-ray irradiation, ultraviolet irradiation, nitrogen mustards, and the like.

The new antibiotic of the present invention is a basic compound forming salts with acids, both inorganic and organic, such as hydrochloric, tartaric, salicylic, etc., and other compounds. The free base form of methobottromycin possesses the following physical and chemical properties:

a. Crystallizes from ethyl acetate in the form of white prisms melting at a temperature of from about 166° to 167° C.

b. Easily soluble in alcohols, esters, ethers, chlorinated solvents and benzene.

c. Partly soluble in water.

d. Insoluble in petroleum ether, hexane and the like.

e. Has a specific rotation of $[\alpha]_D^{20} = -15°$ in a 5 percent solution of 95 percent ethanol.

Unfortunately, in contrast to other antibiotics, methobottromycin is found to be an exceedingly complex compound having a molecular weight of about 800. Consequently, thus far it has not been possible to determine the exact complete composition of methobottromycin. It has been found that this composition contains the elements carbon, hydrogen, nitrogen, sulfur and oxygen. The found percentages of these elements are as follows:

C — 59.50%
H — 7.52%
N — 13.50%
S — 3.90%
O — 15.58% (by difference)
Total — 100.00%

These data suggest a molecular structure $C_{41}H_{62}N_8O_7S$, but other similar molecular formulae are possible within the experimental error of these determinations.

The infrared absorption spectrum of the antibiotic methobottromycin in chloroform using sodium chloride prism is illustrated in the accompanying drawing. The more significant of the characteristic peaks occur at the following wave lengths expressed in reciprocal centimeters: 3,300, 2,950, 1,730, 1,630–1,650, 1,490, 1,360, 1,300, 1,242, 1,160, 1,132, 1,119, 1,102, 980, 806.

The above infrared spectrum readings can be more clearly seen in the attached drawing. Upon acid hydrolysis, methobottromycin yields six ninhydrin-positive substances, none of which include proline.

Methobottromycin exhibits characteristic $R_f$ values in the following solvent systems:

| | $R_f$ |
|---|---|
| n-butyl alcohol saturated with 1% aqueous acetic acid | 0.85 |
| n-butyl alcohol saturated with 2% aqueous pyridine | 0.84 |
| ethyl acetate saturated with 1% aqueous acetic acid | 0.37 |
| ethyl acetate saturated with 0.1M phosphate buffer (pH 7) | 0.83 |
| benzene:hexane:methanol:5% aqueous acetic acid (7:6:10:6) | 0.0 |
| benzene:hexane:methanol:5% aqueous pyridine (7:6:10:6) | 0.5 |
| benzene saturated with 1% aqueous acetic acid | 0.0 |
| benzene saturated with 2% aqueous pyridine | 0.5 |
| capryl alcohol saturated with 0.1M pH6 phosphate buffer (reverse phase) | 0.19 |

(In all cases paper was wetted with stationary phase.)

Characteristics of the antibiotic of the present invention may also include thin layer chromatography. Thin layer chromatographic plates containing silica gel are developed in 94 percent chloroform and 6 percent methanol, dried and placed in a chamber containing iodine vapor. A brown stain indicates the presence of the antibiotic of the present invention, methobottromycin. The $R_f$ of this zone is 0.64.

The culture producing methobottromycin produces generally two types of substances: a netropsin-type antibiotic and a bottromycin-type antibiotic. The bottromycin group of antibiotics from which methobottromycin is extracted, is readily separated from the netropsin group by extraction with chloroform from aqueous solutions. The chloroform extract, after purification, shows the presence of five antibiotic substances on bioautograph of paper strips. The paper strip system utilized for this test consists of paper impregnated with capryl alcohol and developed downflow with buffer, wherein the $R_f$ of methobottromycin is 0.19. The five components have been designated components A through E in order of decreasing polarity. It is significant that methobottromycin demonstrated considerably greater antibiotic activity than any of the other components. Table A below lists bioactivity of all of the components of bottromycin. The first column "Staph. MIC" is a tube dilution assay which measures the minimal inhibitory concentration of the antibiotic in a broth culture of the test microorganism, Staphylococcus aureus. The second column "In Ova $ED_{50}$" is an in ova assay which measures the effective dose level of the antibiotic in protecting an embryonated egg from a known infection of microorganism, in this case, Mycoplasma gallisepticum (PPLO). This assay is modeled after the test system described by R. Yamamoto and H. E. Adler (Am. J. Vet. Res., July 1965) except that the parameter used to measure effectiveness of the drug was protection against mortality instead of prolongation of the embryo's life.

TABLE A

| Component | Staph. MIC μg/ml | In Ova $ED_{50}$ μg/egg |
|---|---|---|
| A | 3.0 | 720 |
| B (Amethobottromycin) | 0.23 | 13 |
| C (Methobottromycin) | 0.04 | 5 |
| D | 0.16 | 10 |
| E | 0.23 | 5 |

Table B shows that ninhydrin-producing substances are liberated from the five components on acid hydrolysis and paper chromatography.

TABLE B

| Ingredient | A | (Amethobottromycin) B | (Methobottromycin) C | D–E* |
|---|---|---|---|---|
| glycine | + | + | + | + |
| proline | + | + | – | + |
| thiazole | + | + | + | + |
| methyl proline | – | – | + | + |
| valine | + | + | + | + |
| unknown A | + | + | + | + |
| unknown B | + | | | |
| β-methyl phenylalanine | + | + | + | + |

*percentage present too small to separate

As can be seen from Table B, methobottromycin contains methyl proline but does not contain proline.

In an aqueous solution at pH greater than 10, the antibiotic is unstable. However, at pH from 3 to 9 the product is stable for 24 hours at room temperature.

Methobottromycin is active in inhibiting gram positive microorganisms primarily although it exhibits some activity against gram negative microorganisms.

The new antibiotic of the present invention is produced by the aerobic fermentation of Streptomyces

*canadensis* MA–959 in a suitable aqueous medium. Aqueous mediums such as those employed for the production of other antibiotics are suitable for the production of methobottromycin. Such mediums contain sources of carbon and nitrogen, assimilable by the microorganism, and inorganic salts. In addition, the fermentation mediums contain traces of metal necessary for the growth of the microorganism which are usually present in complex sources of carbon and nitrogen in the medium.

In general, carbohydrates such as sugars, for example, dextrose, sucrose, dextrin and the like, are suitable sources of assimilable carbon. The exact quantity of the carbon source will depend, in part, upon the other ingredients of the medium, but it is usually found that an amount of carbohydrate between about 1 and 6 percent by weight of the medium is satisfactory. These carbon sources can be used individually, or several such sources may be combined in the medium.

Various nitrogen sources such as casein hydrolysates, amino acids, for example, asparagine, glycine, arginine, digests of soybean meal, soybean meal, distillers solubles, and the like are readily assimilated by the methobottromycin producing microorganisms and can be used in fermentation mediums for the production of this antibiotic. In general, we find that organic sources of nitrogen, particularly soybean meal, are very satisfactory for the production of the new antibiotic. The various organic and inorganic sources of nitrogen can be used either alone or in combination in amounts ranging from about 0.2 percent to about 6 percent by weight of the aqueous medium.

The following example illustrates a method of preparing the antibiotic of the present invention, but it is to be understood that it is given for purposes of illustration and not of limitation.

EXAMPLE 1

A. Fermentation

A medium containing 1 percent dextrose, 0.3 percent meat extract, 1.0 percent tryptic digest of casein, and 0.5 percent sodium chloride was made up in water and adjusted to pH 7.0 with sodium hydroxide, sterilized and aseptically added to a slant culture of *Streptomyces canadensis* MA–959 (ATCC 17776) and the spores scraped into suspension. About 3 ml. of this spore suspension was aseptically added to a stoppered 2 liter baffled Erlenmeyer flask containing 500 ml. of sterile aqueous medium consisting of 1 percent dextrose, 0.3 percent meat extract, 1.0 percent tryptic digest of casein, and 0.5 percent sodium chloride and the pH again adjusted to 7.0. The flask was incubated at 28° C. on a rotary shaker at a speed of 120 RPM with a 2-inch throw for a period of 48 hours.

This vegetative culture was then aseptically added to a 50-gallon stainless steel fermenter containing about 30 to 40 gallons of sterile medium having a composition comprising 1.5 percent yeast autolysate, 1 percent dextrose, 0.25 percent sodium chloride with the pH adjusted to 7.5. The inoculated medium was incubated at 28° C. for 40 hours during which time it was agitated with sterile air being passed through the medium at a rate of about 3 cubic feet per minute. About 8.4 percent of this vegetative culture was employed to inoculate a 150-gallon stainless steel fermenter containing about 120 gallons of a medium having the composition comprising 1.5 percent yeast autolysate, 0.5 percent sodium chloride, and 3 percent dextrose at pH 7.0 previously sterilized with steam at about 120° C. for 15 minutes. The culture was incubated at 28° C. with agitation and aeration at a rate of 10 CFM until maximum antibiotic yield was obtained.

B. Recovery

The antibiotic of the present invention was recovered from the fermentation broth by adjusting the pH of the broth to 4.8 with hydrochloric acid and filtering. The filtered broth was passed through a Dowex 50 × 2 sodium cycle resin (5 gallons) at a rate of 0.5 gallons per minute. The resin was washed with 10 gallons of water and eluted with 50 gallons of 70 percent methanol, 30 percent 1N ammonia at a rate of 0.25 gallons per minute. Ten 5-gallon cuts were taken and each was neutralized to a pH 7 with 5 percent hydrochloric acid. The cuts were assayed and the active cuts were evaporated to 7.5 gallons of water. The concentrate was adjusted to pH 8 and extracted three times with an equal volume of chloroform, and the extracts were dried over sodium sulfate. The rich chloroform was passed through a column containing a mixture of 70 percent Florisil, 30 percent Celite 545 at a 10 minute contact time. The absorption was followed with 10 gallons of chloroform wash followed by 50 percent chloroform-acetone elution at the same rate. ½ gallon cuts of the eluate were taken and the cuts were assayed. The active cuts were combined and evaporated to 0.5 gallons of chloroform. The chloroform concentrate was dried in a dish and taken up in about 160 ml. of methanol. Ten volumes of ethyl ether were added and the insolubles filtered. A 10 to 1 methanol-concentrated hydrochloric acid solution was added to the ether filtrate with stirring until no further precipitation occurred. The precipitate was filtered, washed with ether and dried.

Methobottromycin of the present invention was isolated by partition chromatography with 0.1 M pH 6.0 phosphate buffer as a developing solvent. Celite impregnated with capryl alcohol was used as the stationary phase. The stationary phase is made by wetting 250 lbs. of acid washed celite (diatomaceous earth) with a solution of 6 gallons of capryl alcohol and 24 gallons of acetone. The celite is air dried to remove acetone and packed in a satisfactory column in thin layers and tamping, to insure uniformity. After packing, the column is washed with 0.1 M pH 6.0 phosphate buffer until one-half volume of buffer has emerged. About 40 grams of the crude hydrochloride described above is dissolved in 8 gallons of pH 6.0 buffer and placed on the column. The column was developed with pH 6.0 buffer taking 5 gallon cuts. Each fraction is assayed and examined by paper chromatography. The rich fractions were worked up by concentration to about one-fifth volume, adjusted to pH 8.5 and extracted two times with an equal volume of chloroform. The chloroform solutions were evaporated to dryness. The residual solids were dissolved in a small amount of methanol (about 500 ml.) and diluted with 20 volumes of ethyl ether and filtered. To the filtrate was added 1.2 N methanolic HCl until further addition caused no precipitation.

The antibiotic HCl was collected and dried in vacuo with the following results:

| Antibiotic | Fraction | Amount |
|---|---|---|
| Methobottromycin | 39-60 | 13.4 g. |

Methobottromycin and its salts are valuable antibacterial agents which, as has been pointed out above, are active in inhibiting the growth of various gram positive organisms. However, these antibiotics are extremely useful in the treatment of chronic respiratory disease of chickens and infectious sinusitis of turkeys. In this embodiment of the present invention, it has been found that chronic respiratory disease of chickens and infectious sinusitis of turkeys may be effectively inhibited by the use of methobottromycin or its salts which may be administered by either the subcutaneous or the oral route. Furthermore, it has been found that methobottromycin and its salts are effective in controlling chronic respiratory disease of chickens and infectious sinusitis of turkeys when administered in dosages ranging from about 0.1 mg./kg. to about 250 mg./kg. of body weight of the bird without the resulting danger of toxicity and preferably from 0.5 mg./kg. to 150 mg./kg. of body weight of the bird, depending on the route of therapy.

In order to illustrate the activity and the advantages of the present invention in utilizing methobottromycin as an antibiotic against chronic respiratory disease of chickens and infectious sinusitis of turkeys the following tests are given. It is understood, however, that they are given merely for the purpose of illustration and in no way are they to be taken as limiting.

TEST 1

Activity of Methobottromycin Tartrate Salt

Groups of 6-day old white Leghorn chickens were employed in this test. Methobottromycin tartrate was administered by the subcutaneous route. Doses of 2.0 to 100 mg./kg. of bird were administered 18 and 25 hours after infection. The birds were infected by injecting intra-air sac a 72-hour old broth culture of *Mycoplasma gallisepticum* (PPLO), serotype A, strain S-6 (from H. E. Adler, University of California—isolated from the brain of an infected turkey. The test was terminated 4 weeks after infection and the results were evaluated on the bases of mortality and body weight gain.

TABLE I

| Sample | Dose mg/kg (1, 18, 25 hrs) S.C. | Mortality | Avg. wt. Gain-mg. | % Wt. Gain |
|---|---|---|---|---|
| Normal Controls | — | 0/12 | 215 | — |
| Infected Controls | — | 9/12 | 138 | 64 |
| Methobottromycin | 3 × 2 | 0/6 | 211 | 98 |
| | 3 × 10 | 1/6 | 178 | 83 |
| | 3 × 25 | 0/6 | 193 | 90 |
| | 3 × 50 | 0/6 | 222 | 103 |
| | 3 × 100 | 0/6 | 224 | 104 |

In the above test the body weight gain in the birds treated by the method of the present invention showed significant increase over those of the infected controls. In addition, where 9 out of 12 or 75 percent of the infected controls died, only 1 out of 30 or 3 percent of the birds treated by the method of the present invention died.

TEST 2

Activity of Methobottromycin Free Base

Groups of 6-day old white Leghorn chickens were employed in this test. Methobottromycin was administered by the subcutaneous route in doses of 0.8 to 4.0 mg./kg. of bird, 18 and 25 hours after infection. The birds were infected via the air-sac route and the results evaluated by the same method as in Test 1 above. The test was terminated after three weeks.

TABLE II

| Sample | Dose mg/kg | Mortality | Avg. wt. Gain-gm. | % Wt. Gain |
|---|---|---|---|---|
| Normal Controls | — | 0/6 | 207 | — |
| Infected Controls | — | 7/12 | 118 | 57 |
| Methobottromycin | 3 × 0.8 | 0/6 | 148 | 72 |
| | 3 × 2.0 | 2/6 | 158 | 76 |
| | 3 × 4.0 | 0/6 | 177 | 86 |

In the above test the body weight gain in the birds treated by the method of the present invention showed a significant increase over those of the infected controls. In addition, where 7 administration) out of 12 or 58 percent of the infected controls died, only 2 out of 18 or 11 percent of the birds treated by the method of the present invention died.

TEST 3

Activity of Methobottromycin Free Base

Groups of six and 12 chickens were employed in this test. Methobottromycin was administered both subcutaneously as shown in Table IIIA and orally as shown in Table IIIB. In Test IIIA (subcutaneous adminstration) methobottromycin was administered 1, 18 and 25 hours after infection in dosages ranging from 10 to 80 mg./kg. of bird. In Test IIIB (oral administration) methobottromycin was administered in ranges of from 5 to 100 mg./kg. of bird 1 hour after infection. This test was also terminated after 3 weeks. The birds were infected and the results evaluated by the same method as in Test 1 above.

TABLE IIIA

| Sample | Dosages in mg/kg | Mortality | Weight Gain | % Weight Gain |
|---|---|---|---|---|
| Normal Controls | — | 0/12 | 216 | — |
| Infected Controls | — | 7/12 | 144 | 65.5 |
| Methobottromycin | 3 × 10 | 0/12 | 230 | 106.5 |
| | 3 × 20 | 0/12 | 226 | 105 |
| | 3 × 40 | 0/12 | 231 | 107 |
| | 3 × 80 | 0/12 | 223 | 104 |

TABLE IIIB

| Sample | Dosages in mg/kg | Mortality | Weight Gain | % Weight Gain |
|---|---|---|---|---|
| Normal Controls | — | 0/6 | 216.5 | — |
| Infected Controls | — | 7/12 | 128.0 | 59 |
| Methobottromycin | 5 | 2/6 | 175.0 | 81 |
| | 25 | 1/6 | 173.0 | 80 |
| | 50 | 0/6 | 212.5 | 98 |
| | 100 | 0/6 | 199.3 | 92 |

In tests IIIA and IIIB above the body weight gain in the birds treated by the method of the present invention showed a significant increase over those of the infected controls. In addition, in Test A (subcutaneous administration) where 7 out of 12 or 58 percent of the infected controls died, none of the 48 birds treated by the method of the present invention died, showing 100 percent effective activity. In the Test B (oral administration) where 7 out of 12 or 58 percent of the controls died, only 3 out of 24 or 12 ½ percent of the birds treated by the method of the present invention died.

It should of course be understood that the theoretical explanations for the possible formula and proportions of ingredients of methobottromycin as disclosed herein are based on our present knowledge of this product and does not exclude the possibility that subsequent experimental data will establish that the postulated formula and proportions are, in fact, incorrect. Accordingly, it is not desired to be bound by these theoretical considerations, however likely they may appear to be in the light of present knowledge. These explanations are presented principally as a means for providing a better understanding of the present invention.

While specific embodiments of the present invention have been named and described, it will be apparent to those skilled in the art that changes may be made in the detail shown without departing from the spirit of the present invention or the scope intended. Any departure from the above description which conforms to the present invention is intended to be included within the scope of the claims.

We claim:

1. A member of the group consisting of methobottromycin and its acid addition salts, said methobottromycin being characterized by the following properties:
  a. Crystallizing in the form of white prisms melting at the temperature of 166° to 167° C.;
  b. Being soluble in alcohols, esters, ethers, chlorinated solvents and benzene and partly soluble in water;
  c. Having a specific rotation of $[\alpha]_D^{20} = -15°$ in a 5 percent solution of 95 percent ethanol;
  d. Having an infrared absorption spectrum exhibiting characteristic peaks at the following wave lengths expressed in reciprocal centimeters: 3,300, 2,950, 1,730, 1,630–1,650, 1,490, 1,360, 1,300, 1,242, 1,160, 1,132, 1,119, 1,102, 980, 806;
  e. Containing the elements carbon, hydrogen, nitrogen, sulfur, and oxygen in the following approximate proportions:
    C — 59.50%
    H — 7.52%
    N — 13.50%
    S — 3.90%
    O — 15.58% (by difference)
    Total — 100.00%
  f. Having characteristic $R_f$ values in the following solvent systems:

| | $R_f$ |
|---|---|
| n-butyl alcohol saturated with 1% aqueous acetic acid | 0.85 |
| n-butyl alcohol saturated with 2% aqueous pyridine | 0.84 |
| ethyl acetate saturated with 1% aqueous acetic acid | 0.37 |
| ethyl acetate saturated with 0.1M phosphate buffer (pH 7) | 0.83 |
| benzene:hexane:methanol:5% aqueous acetic acid (7:6:10:6) | 0.0 |
| benzene:hexane:methanol:5% aqueous pyridine (7:6:10:6) | 0.5 |
| benzene saturated with 1% aqueous acetic acid | 0.0 |
| benzene saturated with 2% aqueous pyridine | 0.5 |
| capryl alcohol saturated with 0.1M pH 6 phosphate buffer (reverse phase) | 0.19 | g. Yielding a hydrolysis with acid ninhydrin substances not including proline.

2. Methobottromycin as defined in claim 1.

3. Acid addition salts of methobottromycin as defined in claim 1.

4. A process for the preparation of methobottromycin which comprises cultivating *Streptomyces canadensis* ATCC 17776 under aerobic conditions in an aqueous nutrient medium until substantial antibiotic activity is imparted to said medium.

5. The process of claim 4 which comprises cultivating *Streptomyces canadensis* ATCC 17776 under aerobic conditions in a nutrient medium containing soy bean meal, dextrose, distillers solubles, yeast autolysate, and tryptic digest of casein.

6. A method of treating poultry infected with pleuropneumonia-like organisms comprising administering to said infected poultry an effective dose for inhibiting pleuropneumonia-like organisms of an antibiotic selected from the group consisting of methobottromycin and its acid addition salts as defined in claim 1.

7. The method of claim 6 wherein said effective dose is in the range of from about 0.1 mg./kg. to about 250 mg./kg. of body weight of said infected poultry.

8. The method of claim 6 wherein said effective dosage of said antibiotic is administered by subcutaneous route.

9. The method of claim 6 wherein said effective dosage of said antibiotic is administered by oral route.

10. The method of claim 6 wherein the antibiotic administered is methobottromycin.

11. The method of claim 6 wherein the antibiotic administered is an acid addition salt of methobottromycin.

* * * * *